(12) United States Patent
MacKarvich

(10) Patent No.: US 6,375,211 B1
(45) Date of Patent: Apr. 23, 2002

(54) TRAILER HITCH WITH SURGE BRAKING/DAMPENING APPARATUS

(76) Inventor: Charles J. MacKarvich, 3940 Paces Manor Dr., Atlanta, GA (US) 30339

( * ) Notice: Subject to any disclaimer, the term of this patent is extended or adjusted under 35 U.S.C. 154(b) by 0 days.

(21) Appl. No.: 09/583,473

(22) Filed: May 31, 2000

(51) Int. Cl.$^7$ .............................. B60D 13/00; B60T 7/20
(52) U.S. Cl. ................................. 280/491.2; 188/112 R
(58) Field of Search ........................... 280/491.2, 432, 280/428; 188/112 R

(56) References Cited

U.S. PATENT DOCUMENTS

| | | | |
|---|---|---|---|
| 1,896,427 A | * 2/1933 | Selvester | 188/112 R |
| 2,125,702 A | * 8/1938 | Watson | 188/112 R |
| 2,127,912 A | 8/1938 | Graham et al. | 188/142 |
| 2,152,017 A | * 3/1939 | Banning, Jr. | 188/112 R |
| 2,258,876 A | 10/1941 | Banning, Jr. | 188/142 |
| 2,320,585 A | 6/1943 | Gill et al. | 188/142 |
| 2,630,888 A | * 3/1953 | Fikse | 188/112 R |
| 2,698,069 A | 12/1954 | Henry | 188/112 |
| 2,779,443 A | 1/1957 | Tucker | 188/112 |
| 2,921,652 A | 1/1960 | Smith | 188/112 |
| 2,993,568 A | * 7/1961 | Henry | 188/112 R |
| 3,026,975 A | * 3/1962 | Yoder | 188/112 R |
| 3,072,223 A | * 1/1963 | Yoder | 188/112 R |
| 3,077,248 A | 2/1963 | Wayt | 188/112 |
| 3,168,940 A | 2/1965 | Ross et al. | 188/112 |
| 3,570,633 A | 3/1971 | Garnett | 188/112 |
| 3,647,032 A | 3/1972 | Dombeck | 188/112 |
| 3,880,263 A | 4/1975 | Ewald et al. | 188/112 |
| 3,881,577 A | 5/1975 | Wherry et al. | 188/112 |
| 3,892,296 A | * 7/1975 | DePuydt et al. | 188/112 R |
| 4,153,143 A | * 5/1979 | DePuydt et al. | 188/112 R |
| 4,223,766 A | 9/1980 | Huetsch et al. | 188/112 |
| 4,249,643 A | * 2/1981 | Yoder | 188/112 R |
| 4,306,734 A | 12/1981 | Swanson et al. | 280/446 |
| 4,856,621 A | * 8/1989 | Yoder | 188/112 R |
| 4,889,212 A | * 12/1989 | Temple | 188/112 R |
| 5,013,059 A | 5/1991 | Goettker | 280/446 |
| 5,246,243 A | * 9/1993 | Carr | 280/428 |
| 5,492,204 A | 2/1996 | Wallace | 188/112 |
| 5,551,539 A | * 9/1996 | Frymiare | 188/112 R |
| 5,855,418 A | * 1/1999 | Greaves, Jr. | 303/7 |
| 6,027,134 A | * 2/2000 | Hart et al. | 280/491.2 |

OTHER PUBLICATIONS

Dico Model 60 Surg–O–Matic Actuator for Trailer Brakes, #40989 12/95, 11 pages.
Demco Hydraulic Brake Systems, BA12001, Rev 1, Jun. 20, 1996, 12 pages.
Atwood Couplers, Brake Systems and Accessories, BR–1027, 7/89, 8 pages.

* cited by examiner

Primary Examiner—Robert P. Olszewski
Assistant Examiner—Andrew J. Fischer
(74) Attorney, Agent, or Firm—Thomas, Kayden, Hostemeyer & Risley, L.L.P.

(57) ABSTRACT

A trailer is equipped with a surge braking system having a braking/dampening unit 70 that is integrated with a common reservoir 71 that supplies brake fluid to both the master brake cylinder 72 and the dampener cylinder 75, so that if the master cylinder is starved of brake fluid, the dampener also is starved of fluid and the jarring between the forward hitch and the rear housing in response to acceleration and deceleration of the towing vehicle will alert the operator of the towing vehicle to replenish the reservoir with brake fluid. Safety cable 111 connects at one end to the towing vehicle and actuates the master cylinder in response to tension being applied thereto, and latch 98 moves in behind the master cylinder and locks the master cylinder in it operative position so as to hold the brakes in their locked position.

26 Claims, 7 Drawing Sheets

TRAILER HITCH WITH SURGE BRAKING/DAMPENING APPARATUS

TECHNICAL FIELD

The present invention is generally related to self actuated hydraulic trailer braking systems and, more particularly, to an apparatus for alerting an operator of a vehicle which is towing a trailer when the hydraulic brake fluid of the trailer brake system is low.

BACKGROUND OF THE INVENTION

Self-actuated trailer surge brakes are known in the art. Typically, surge brakes have movable sections, a forward unit which is positioned adjacent the ball hitch of the trailer and a rear unit which is positioned rearwardly of the forward unit. The units move with respect to each other when a trailer surges forwardly or rearwardly with respect to the towing vehicle, typically due to the deceleration or acceleration of the towing vehicle. When the rear unit of the surge brake mechanism moves forwardly relative to the forward unit of the surge brake mechanism, the relative movement between the forward and rear units is used to actuate the hydraulic brakes of the trailer. The relative forward motion of the rear unit causes a member on the forward unit to actuate a master brake cylinder on the rear unit. Upon being actuated, the master brake cylinder pressurizes the wheel cylinders to apply the brakes of the trailer.

Although the provision of a surge brake for a trailer prevents the trailer from over running the towing vehicle, the relative movement of the forward and rearward units of the surge brake also creates a potential problem of the jarring of the trailer and towing vehicle when the forward and rearward units clash as they reach the limits of their relative movements.

In order to eliminate the jarring between the forward and rearward units of the surge brake, prior art surge brake mechanisms typically include a hydraulic surge dampener for dampening the relative motion of the rear unit with respect to the front unit of the trailer hitch, and therefore between the trailer and the towing vehicle. The surge dampener relieves the jarring between the units both when the towing vehicle accelerates and decelerates with respect to the trailer. When the towing vehicle accelerates the dampener permits a full and smooth extension of the rear unit with respect to the forward unit, thus eliminating a jarring impact when the front unit fully extends with respect to the rear unit. Likewise, the dampener cushions the movement of the rear unit toward the forward unit of the trailer hitch when the brakes of the vehicle are applied. Typically, the prior art dampener is integrated in parallel with the surge brake mechanism. Without the dampener mechanism, the jarring impact caused by the clash between the rear unit and the forward unit would prematurely decrease the life span of the surge brake mechanism.

However, a problem with such prior mechanisms is that the master brake cylinder can be depleted of hydraulic fluid without the knowledge of the operator of the vehicle. The brake assembly does not give the vehicle operator an indication that the hydraulic brake fluid is depleted and the brakes are not operable.

SUMMARY OF THE INVENTION

Briefly described, the present invention is directed to a self actuated hydraulic braking mechanism for a trailer which includes a master cylinder and a hydraulic dampener, and a single brake fluid reservoir for supplying brake fluid to both the master cylinder and to the hydraulic dampener. When the brake fluid becomes dissipated from the reservoir, it eventually becomes dissipated or "starved" from the dampener and the master cylinder. When there is an inadequate amount of brake fluid in the dampener the dampener begins to fail, in that it begins to inadequately suppress the jarring between the surging of the trailer toward the towing vehicle when the brakes of the towing vehicle are applied, or the surging of the towing vehicle away from the trailer when the towing vehicle accelerates. The operator of the vehicle soon senses the increased surging and jarring between the trailer and the towing vehicle and, as a result, realizes that the brake fluid of the trailer brake system is low and needs replenishing.

Another feature of the invention is a self actuating brake latch which holds the master cylinder of the brakes in an actuated condition in response to the trailer becoming detached from the towing vehicle. A tether or cable is attached between the towing vehicle and the brake mechanism and operates the brake latch when tension is applied to the cable, as when the trailer hitch becomes inadvertently detached from the towing vehicle.

Therefore, it is an object of the present invention to provide an operator of a towing vehicle with a warning when there is an inadequate amount of hydraulic brake fluid in the hydraulic brake fluid reservoir of the surge brakes of a trailer hitch apparatus.

It is another object of the present invention to provide for an integrated dampening/braking apparatus in a hydraulic surge brake of a trailer.

It is another aspect of the invention to provide for a device for manually priming the brakes of a trailer, such that air can be bled from the hydraulic brake lines of the trailer.

It is another object of the invention to provide for an improved device to actuate the brakes of the trailer when the trailer and the towing vehicle becomes separated, and a device that latches the brakes in actuated position when the towing vehicle and trailer become separated.

Still another object of the present invention, is to provide that the latching mechanism can be easily disengaged by the operator.

Other objects, features and advantages of the invention will become apparent from reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The trailer hitch mechanism partly follows conventional details familiar to those skilled in the art so the following description will not deal needlessly with such conventional or irrelevant details.

Figure 1:
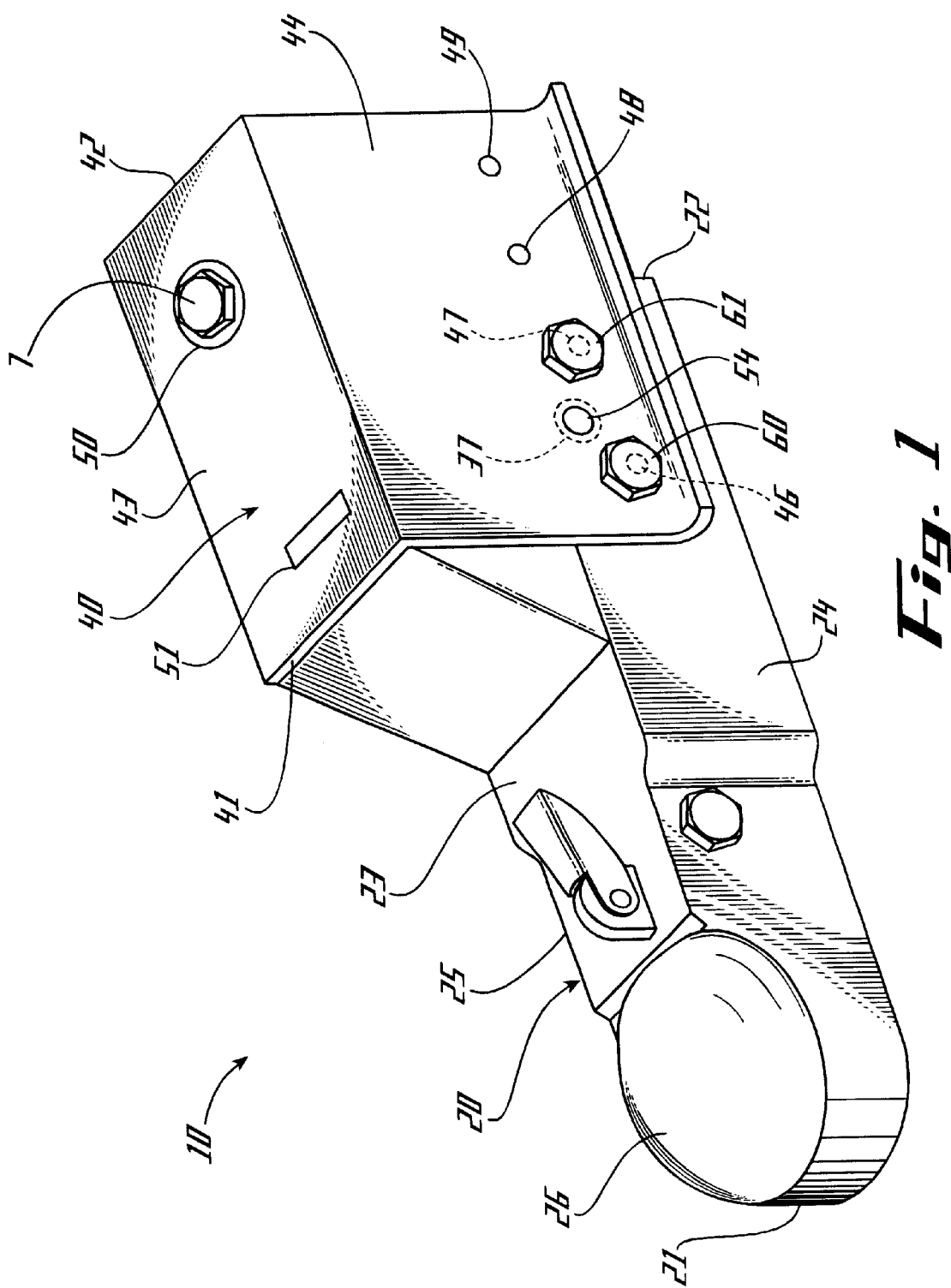
FIG. 1 is a perspective view of the trailer hitch mechanism.
Figure 2:
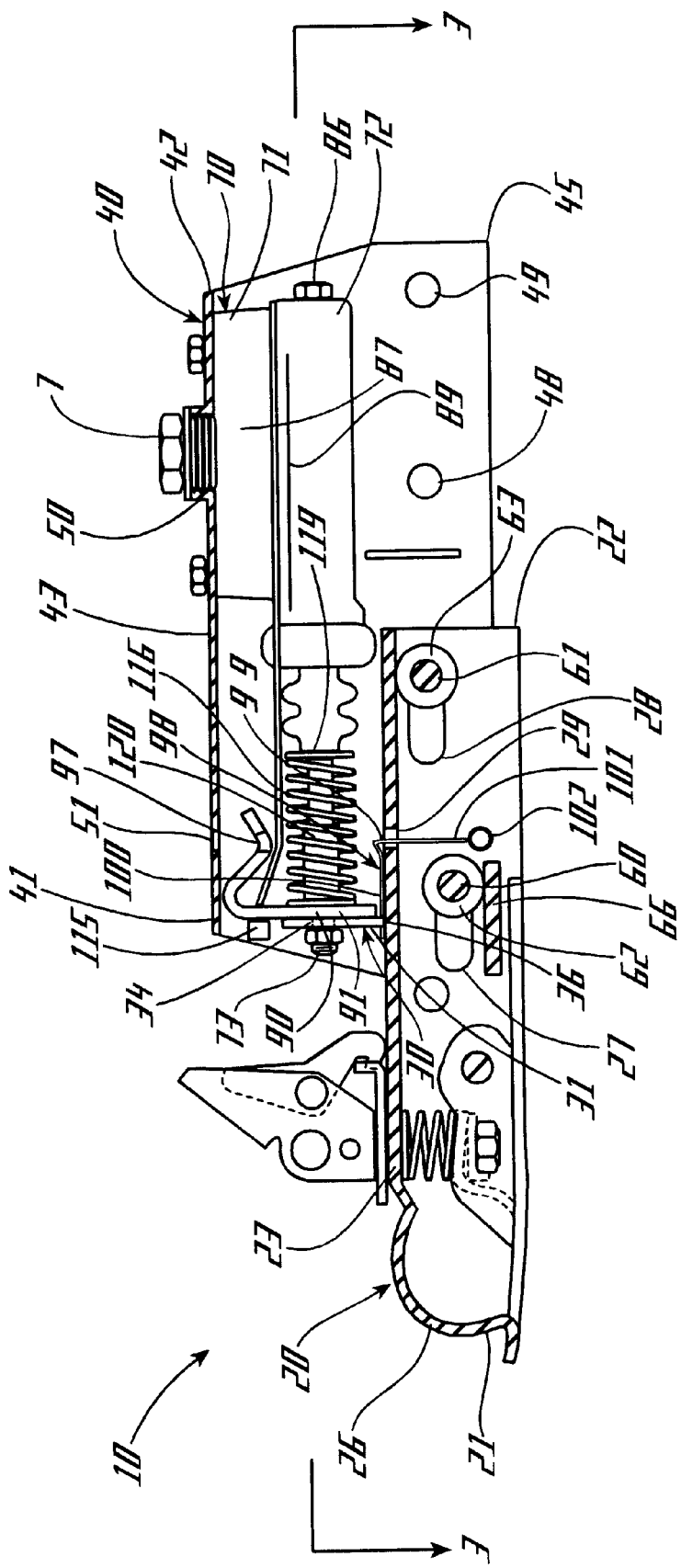
FIG. 2 is a side cross sectional view of the trailer hitch mechanism of FIG. 1, viewed along lines 2—2 of FIG. 3.
Figure 4:
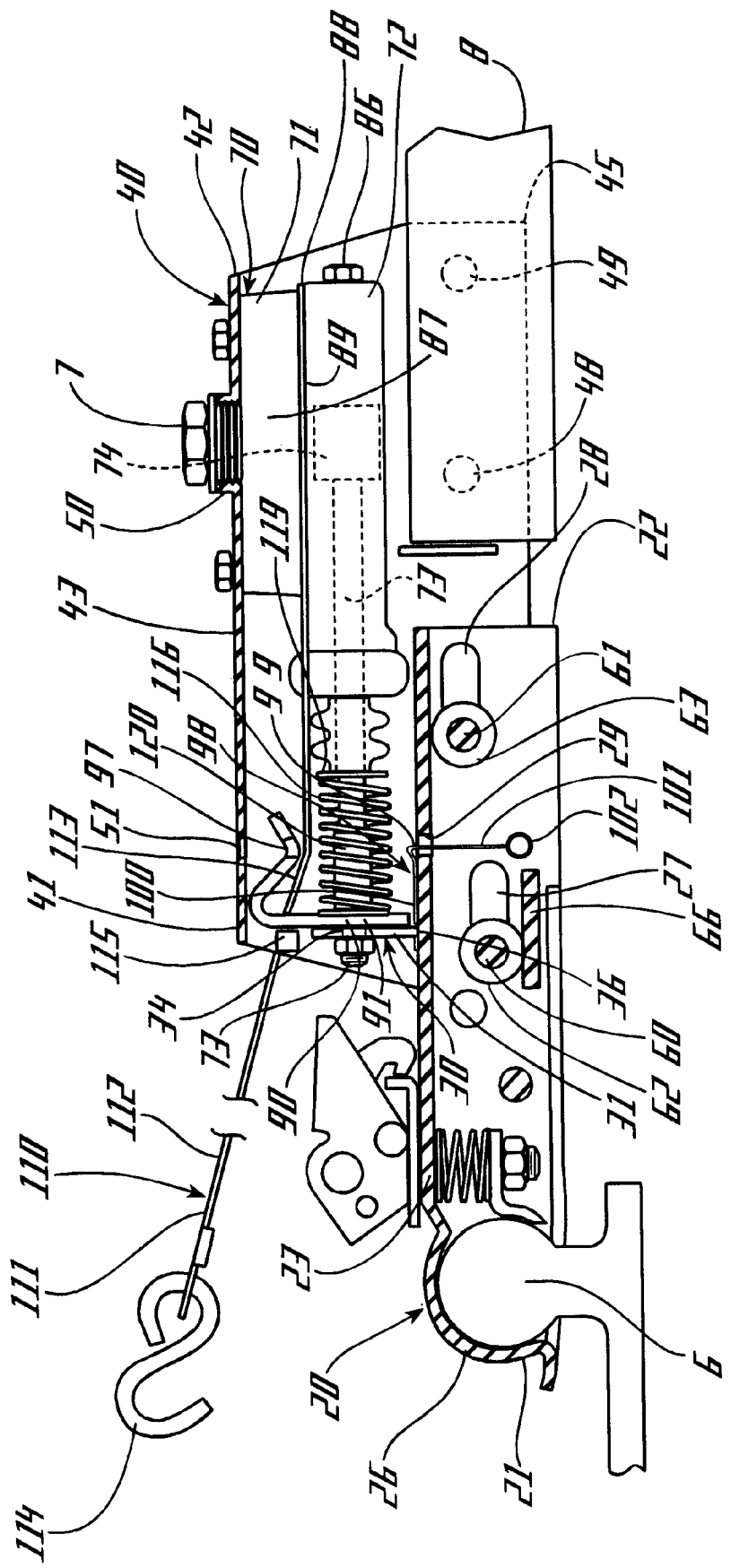
FIG. 4 is a side cross sectional view of the trailer hitch, similar to FIG. 2, but showing the hitch in its retracted position.
Figure 8:
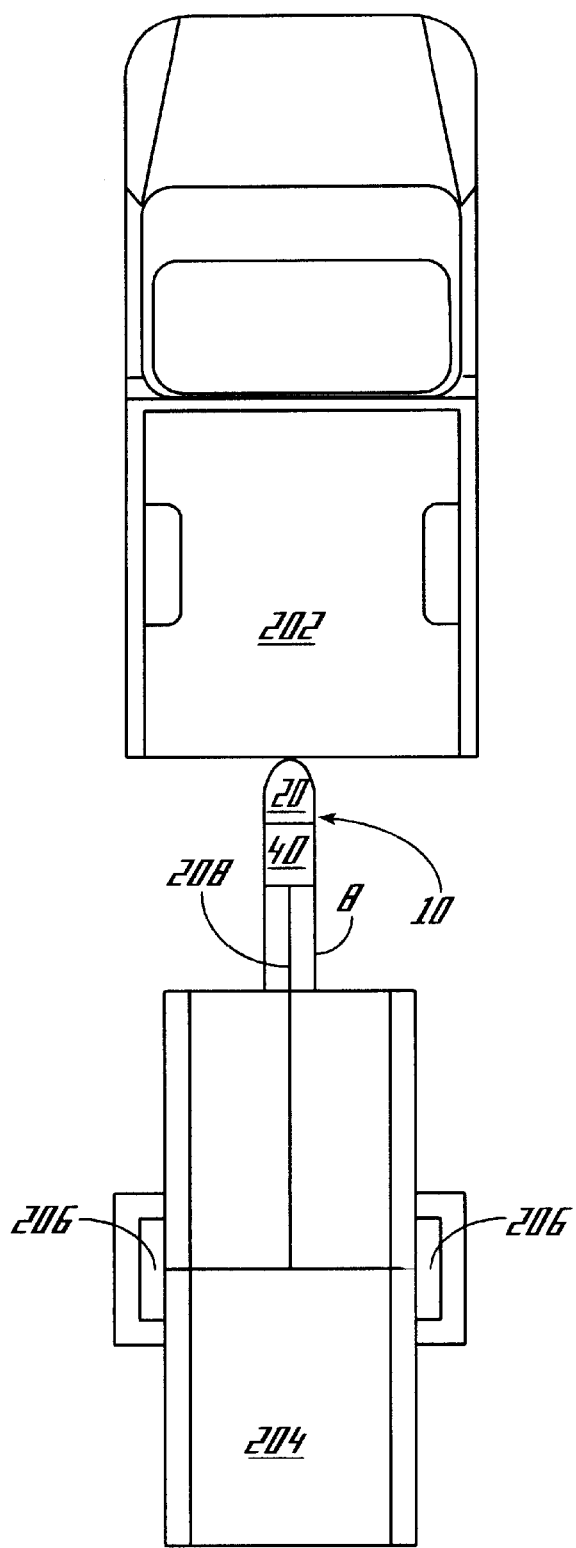
FIG. 8 is a top view of a towing vehicle coupled to a trailer that includes the trailer hitch mechanism.

Referring now to in more detail to the drawings, in which like numbers refer to parts throughout several views, the invention relates to a trailer hitch mechanism 10 for a trailer having hydraulic brakes. Referring now to FIG. 8, a towing vehicle 202 tows trailer 204. The trailer 204 includes hydraulic brakes 206 that are hydraulically connected to hitch mechanism 10 through hydraulic brake line 208. The hitch mechanism 10 includes a rear housing 40 coupled to tongue 8 of the trailer 204 and a forward coupler 20, which is adapted to removably couple with a hitch ball 6, which is shown in FIG. 4, affixed to the towing vehicle 202. Rear housing 40 is adapted to fit around forward coupler 20 and is slidably mounted to the forward coupler 20, thereby allowing relative motion along the longitudinal direction of hitch mechanism 10. FIGS. 1 and 2 illustrate the relative position of forward coupler 20 and rear housing 40 responsive to the towing vehicle 202 pulling the trailer, such that the trailer hitch mechanism 10 is fully extended.

Responsive to the deceleration of the towing vehicle 6, and the corresponding deceleration of forward coupler 20, rear housing 40 tends to move forward relative to forward coupler 20 as illustrated in FIG. 4, such that trailer hitch mechanism is completely contracted. The relative motion of rear housing 40 with respect to forward coupler 20 causes a brake piston head 74 connected to a brake piston rod 73 to pressurize hydraulic brake fluid in a master brake cylinder 72, thereby applying hydraulic pressure to the hydraulic brakes of the trailer. Responsive to acceleration of the towing vehicle or frictional forces exerted on the trailer, such as air resistance, the rear housing 40 tends to move to the position illustrated in FIG. 2, thereby fully extending rear housing 40 relative to forward coupler 20 and relieving the hydraulic brake pressure in master brake cylinder 72. The actuation of the braking mechanism and the relative motion of rear housing 40 with respect to forward coupler 20 will be discussed in greater detail herein below.

Referring to FIG. 1, forward coupler 20 formed from a piece of heavy duty sheet metal has a front end 21, a rear end 22, a top wall 23, a first side wall 24 and a second side wall 25 extending generally downwardly from the top wall 23. The front end 21 has a socket 26, formed integrally within forward coupler 20, with a downward opening for receiving hitch ball 6. Forward coupler 20 is secured to hitch ball 6 by means known in the art and will not be discussed in detail.

Figure 3:
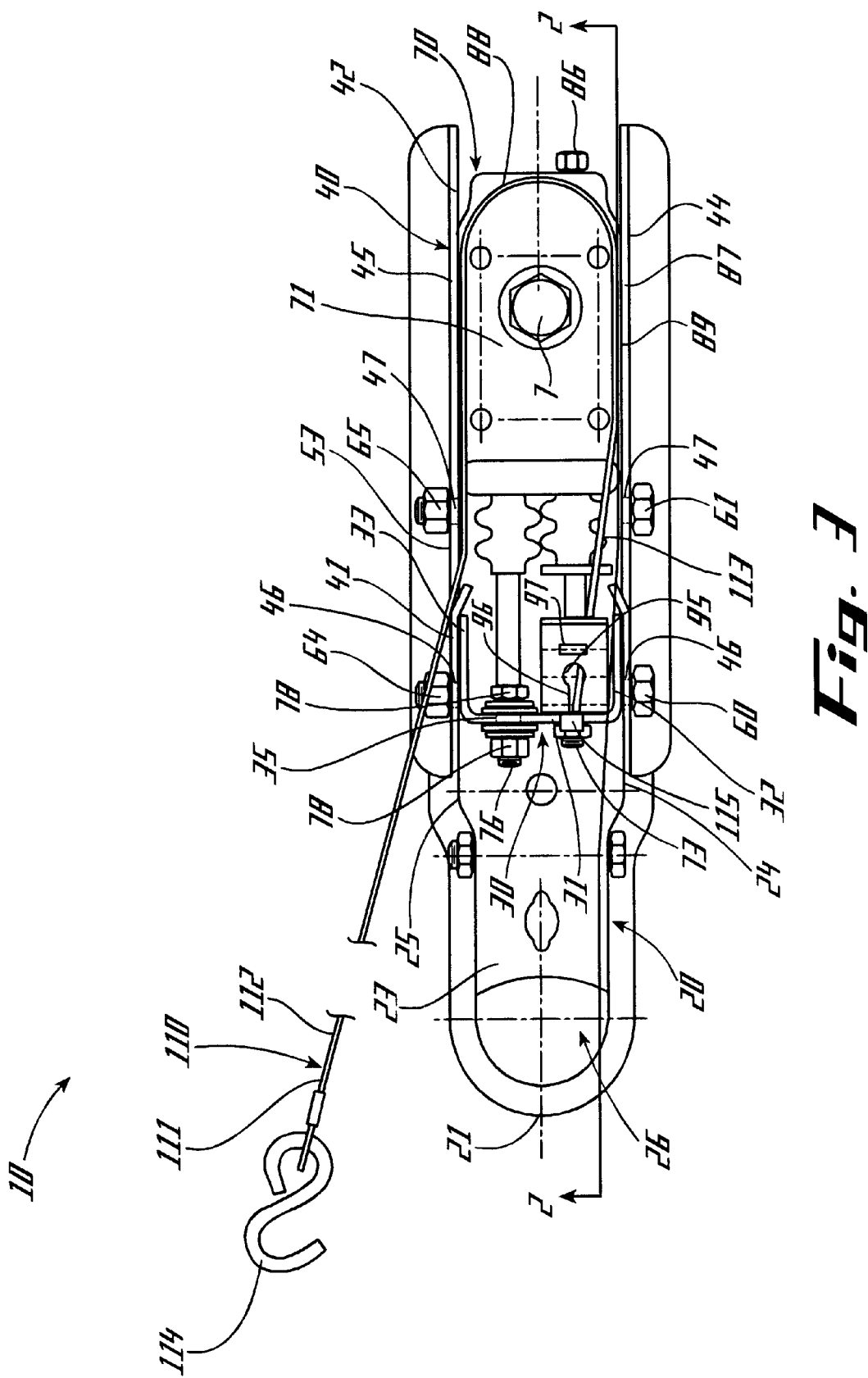
FIG. 3 is a top cross sectional view of the trailer hitch, taken along lines 3—3 of FIG. 2.

Referring to FIGS. 2 and 4, cross sectional views of trailer hitch mechanism 10 taken along the 2—2 of FIG. 3, each of the opposed side walls 24 and 25 of the forward coupler 20 have aligned front axle slots 27 and aligned rear axle slots 28 formed therethrough for receiving axle bolts 60 and 61 respectively. The longitudinal dimension of the pairs of slots 27 and 28 extend generally in the longitudinal direction of hitch mechanism 10. Front axle slots 27 are offset in front of and below the rear axle slots 28.

Referring to FIGS. 2–4, forward coupler 20 further includes a U-shaped coupling bracket 30 that extends generally upwardly from top wall 23. U-shaped coupling bracket 30 is formed from a piece of heavy duty sheet metal such that it has side legs 32 and 33 and base leg 31, and such that base leg 31 is generally narrower than the width of top wall 23. Side legs 32 and 33 extend rearwardly from base leg 31, generally parallel to first sidewall 24 and second side wall 25, respectively. Base leg 31 has a first hole 34 and a second hole 35 formed therethrough, each for receiving a piston rod. U-shaped coupling bracket 30 is permanently affixed to top wall 23 by means such as welding.

Referring to again to FIG. 1, rear housing 40 has a front end 41, a rear end 42, a top wall 43, a first side wall 44 and a second side wall 45 extending generally downwardly from top wall 43 and is formed from heavy duty sheet metal in an inverted U-shape, such that front end 41 of rear housing 40 is sized and shaped to fit about rear end 22 of forward coupler 20, and rear end 42 of rear housing 40 straddles the tongue 8 of the trailer. Opposed sidewalls 44 and 45 have a first pair of aligned axle bolt holes 46 and a second pair of aligned axle bolt holes 47 formed therethrough for receiving axle bolts 60 and 61, respectively. The first pair of axle bolt holes 46 and second pair of axle bolt holes 47 are arranged such that when rear housing 40 is assembled with forward coupler 20, the pairs of axle bolt holes 46 and 47 are aligned with the pairs of axle slots 27 and 28, respectively, of forward coupler 20, and receive the bolts 60 and 61. In addition, proximal to rear end 42 of rear housing 40 opposed side walls 44 and 45 have aligned pairs of bolt holes 48 and 49 formed therethrough for bolting rear housing 40 to the tongue 8 of the trailer. In addition, top wall 43 of rear housing 40 has threaded cap hole 50 formed therethrough for receiving cap 7 and has opening 51 formed therethrough proximal to front end 41.

Referring to FIG. 2 and FIG. 3, when rear housing 40 is assembled with forward coupler 20, threaded axle bolt 60 extends through axle bolt hole 46 of first side wall 44 of rear housing 40, through the pair of aligned front axle slots 27 of forward coupler 20, and through axle bolt hole 46 of second side wall 45 of rear housing 40, and is secured in position by nut 64. A pair of juxtaposed front bearings 62 is mounted to axle bolt 60 between the opposed sidewalls 24 and 25 of forward coupler 20. A load bearing plate 66 is rigidly affixed, by means such as welding, to the opposed sidewalls 24 and 25 of forward coupler 20 beneath front axle slots 27 for bearing against bearings 62. Threaded axle bolt 61 extends through axle bolt hole 47 of first side wall 44 of rear housing 40, through the pair of aligned rear axle slots 28 of forward coupler 20, and through axle bolt hole 47 of second side wall 45 of rear housing 40, and is secured in position by nut 65. A pair of juxtaposed rear bearings 63 is mounted to axle bolt 61 between the opposed sidewalls 24 and 25 of forward coupler 20. Rear bearings 61 bear against the inner surface of top wall 23 of forward coupler 20. The longitudinal length of axle slots 27 and 28 defines the range of the relative motion between forward coupler 20 and rear housing 40. In FIG. 2 the trailer hitch mechanism 10 is fully extended with the axle bolts 60 and 61 being in contact with the rear of axle slots 27 and 28, respectively. In FIG. 4 the trailer hitch mechanism 10 is fully contracted with axle bolts 60 and 61 being in contact with the front of axle slots 27 and 28, respectively.

Figure 5:
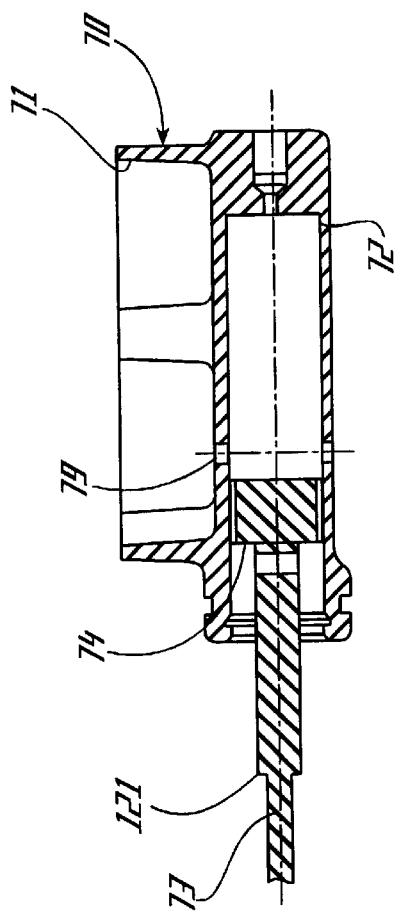
FIG. 5 is a side cross sectional view of the master brake cylinder, brake plunger and reservoir.
Figure 6:
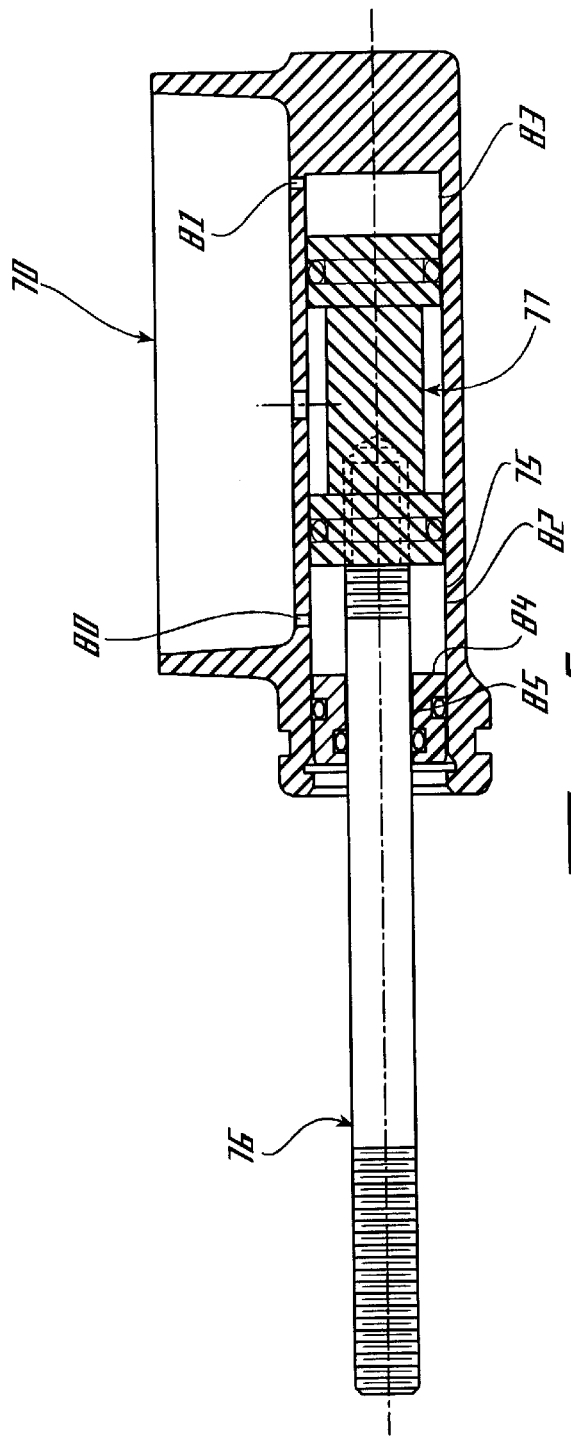
FIG. 6 is a side cross sectional view of the dampener cylinder, dampener plunger and reservoir.

Referring to FIGS. 5 and 6, braking-dampening apparatus 70 includes hydraulic brake fluid reservoir 71, master brake cylinder 72, brake piston rod 73, brake piston head 74, dampener cylinder 75, dampener piston rod 76, and dampener piston head 77. As illustrated in FIGS. 2 and 4, hydraulic brake fluid reservoir 71 is rigidly affixed to the interior portion of rear housing 40 proximal to the rear end 42. Hydraulic brake fluid reservoir 71 is in communication with threaded cap hole 50, thus hydraulic brake fluid can be poured into reservoir 71 through cap hole 50.

Referring again to FIGS. 5 and 6, hydraulic brake fluid reservoir 71 is in communication with master brake cylinder 72 through aperture 79 so that hydraulic brake fluid can be transferred between hydraulic brake fluid reservoir 71 and master brake cylinder 72. In addition, hydraulic brake fluid reservoir 71 is in communication with dampener cylinder 75 through front restrictive aperture 80 and rear restrictive aperture 81. Restrictive apertures 80 and 81 are narrow apertures for transferring hydraulic brake fluid between hydraulic brake fluid reservoir 71 and dampener cylinder 75. Thus, master brake cylinder 72 and dampener cylinder 75 are in separate communication with hydraulic brake fluid reservoir 71.

Master brake cylinder 72 and dampener cylinder 75 are approximately parallel and aligned along the longitudinal direction of hitch mechanism 10 and rigidly affixed to the bottom portion of reservoir 71. In another implementation master brake cylinder 72, dampener cylinder 75, and reservoir 71 are integrally formed. A hydraulic brake fluid line of the trailer is coupled to the rear end of master brake cylinder 72 by coupling nut 86 (FIG. 2). Thus, the interior of master brake cylinder 72 is in communication with the trailer's hydraulic brake fluid line, thereby enabling hydraulic pressure generated in master brake cylinder 72 to be transmitted to the trailer's hydraulic brakes via the trailer's hydraulic brake fluid line.

Referring to FIG. 4, the braking/dampening apparatus 70 further includes safety actuating plate 90, tube 120, coil spring 116 and washer 119, which are configured to cooperate with piston rod 73 to actuate the brakes of the trailer responsive to rear housing 40 moving forward relative to forward coupler 20. Piston head 74 is rigidly affixed to hydraulic brake piston rod 73, which extends therefrom to beyond coupling bracket 30 through piston rod hole 34 of base leg 31 and is slidably coupled thereto. Safety actuating plate 90 is rigidly affixed to tube 120 and abuts base leg 31. Tube 120 is slidably mounted on piston rod 73 between base leg 31 and master brake cylinder 72 and safety actuating plate is configured so that it does not fit through brake piston rod hole 34. Washer 119 is mounted on piston rod 73 between master brake cylinder 72 and safety actuating plate 90. Piston rod 73 is stepped so that the diameter of the forward portion of piston rod 73 is less than the rearward portion of piston rod 73, as shown in FIG. 5. Washer 119 is configured to be slidably mounted on only the forward portion of piston rod 73. Coil spring 116 is mounted around piston rod 73 between safety actuating plate 90 and washer 119 and pushes safety actuating plate 90 against base leg 31 and pushes washer 119 against step 121 of piston rod 73. Thus, as rear housing 40 moves forward with respect to forward coupler 20, piston rod 73 moves forward and consequently so does washer 119 while safety actuating plate 90 remains abutted against base leg 31, thereby compressing coil spring 116 between safety actuating plate 90 and washer 119. The compression of coil spring 116 causes washer 119 to be pushed rearward with respect to forward coupler 20, thereby causing piston rod 73 and piston head 74 to move rearward with respect to master brake cylinder 72, and consequently, pressurizing the hydraulic brake fluid in master brake cylinder 72. Thus, during normal deceleration the trailer's brakes are smoothly applied due to the compression of coil spring 116. However, in the event of rapid deceleration of the towing vehicle rear housing 40 will move rapidly forward with respect to forward coupler 20 necessitating the need for the trailer's brakes to be quickly applied. Thus, when rear housing 40 moves far enough forward washer 119 is abutted against tube 120, thereby preventing piston rod 73 from sliding further forward, and consequently, actuating the trailer's brakes as rear housing 40 moves further forward.

Referring to FIG. 6, dampener cylinder 75, dampener piston rod 76 and dampener piston head 77 are configured to cooperate in such a way so as to resist relative motion between forward coupler 20 and rear housing 40. The rearward end of dampener cylinder 75 is closed except for restrictive aperture 81. At the front end of dampener cylinder 75 is stopper 84 which is adapted to fit snugly within the front end of dampener cylinder 75 and, thereby, preventing hydraulic brake fluid from leaking out of dampener cylinder 75. Stopper 84 has piston rod hole 85 formed therethrough aligned coaxial to dampener cylinder 75, and adapted to receive dampener piston rod 76 snugly, so as to prevent hydraulic brake fluid from leaking out of dampener cylinder 75.

Referring to FIGS. 3 and 6, dampener piston rod 76 extends from beyond base leg 31 through dampener piston rod coupling hole 35 through piston rod hole 85 of stopper 84 to dampener piston head 77 and is rigidly affixed thereto. Dampener piston rod 76 is threaded and is rigidly affixed to base leg 31 by tightening opposed nuts 78 around base leg 31.

Referring to FIG. 6, dampener piston head 77 essentially divides dampener cylinder 75 into two chambers, fore chamber 82 and aft chamber 83, each chamber being in communication with reservoir 71 by restrictive apertures 80 and 81, respectively. When the towing vehicle decelerates, rear housing 40 moves forward with respect to forward coupler 20, and consequently, so does dampener cylinder 75. Dampener piston head 77 is rigidly affixed to dampener piston rod 76, which is rigidly affixed to base leg 31, and thus, as dampener cylinder 75 moves forward relative to forward coupler 20 hydraulic brake fluid in aft chamber 83 is pressurized and in fore chamber 82 a vacuum is created. In response to the pressure differential between hydraulic brake fluid reservoir 71 and fore chamber 82 and aft chamber 83, caused by the contraction of trailer hitch mechanism 10, hydraulic brake fluid is transferred from aft chamber 83 to reservoir 71 and from reservoir 71 to fore chamber 82 via restrictive apertures 80 and 81. While trailer hitch mechanism 10 is extending, due to acceleration of towing vehicle 6, hydraulic brake fluid is transferred from fore chamber 82 to reservoir 71 and from reservoir 71 to aft chamber 83. The transfer of hydraulic brake fluid between the reservoir 71 and the dampener cylinder 75 via restrictive apertures 80 and 81 dampens the relative motion of rear housing 40 with respect to forward coupler 20.

The integrated braking-dampening apparatus 70 provides an important safety feature over a device having separate braking apparatus and dampening apparatus. A person using a vehicle to tow a trailer having a separate braking apparatus and a separate dampening apparatus will not be able to determine whether or not there is hydraulic brake fluid in the reservoir during normal acceleration/deceleration. Even when the hydraulic brakes are not functional, due to a lack of hydraulic brake fluid, the separate dampener continues to operate. Under normal operation, non-emergency stopping, the dampener gently resists the relative motion of forward coupler 20 and the rear housing 40, and consequently there is little or no jarring impact, because the axle bolts 60 and 61 do not slam into the ends of axle slots 27 and 28, respectively. Whereas, in the instantaneous invention, the reservoir is in separate communication with both the master brake cylinder 72 and the dampener cylinder 75. Therefore, if there is no hydraulic brake fluid, then the dampener is no longer operable, and even a gentle deceleration, or acceleration, will result in a jarring impact when the axle bolts 60 and 61 slam into the ends of axle slots 27 and 28, respectively. Upon hearing and/or feeling the impact the operator of the vehicle is alerted to the fact that the reservoir no longer contains an adequate amount of hydraulic brake fluid, and that the trailer's brakes are inoperable. Thus, even when the operator fails to regularly check the hydraulic brake fluid in the reservoir, as is frequently the case, the integrated brakingdampening apparatus 70 alerts the operator to the lack of hydraulic brake fluid under normal operating conditions.

Referring to FIG. 3 and FIG. 4, hitch assembly 10 includes a self-actuated safety device 110 for applying the trailer's brakes responsive to the forward coupler 20 becoming disconnected from ball 6 during towing. The safety device 110 includes a safety cable 111, safety actuating plate 90, washer 119 and coil spring 116. Cable 111 has a first end 112, a second end 113, and is longitudinally flexible and has an S-hook 114 attached to the first end 112 for attaching to the towing vehicle and plug 115 attached to the second end 113 for attaching to safety actuating plate 90. In this implementation, proximal to the front end 41 of second side wall 45 of rear housing 40 is cable opening 53 formed therethrough for receiving safety cable 111. When in operable position cable 111 extends from the towing vehicle through cable opening 53, around the rear end of reservoir 71 to safety actuating plate 90. Safety actuating plate 90 is configured so as to couple with cable 111, as will be described herein below.

Reservoir 71 is configured so as to have sides 87 extending generally parallel to the side walls 44 and 45 of rear housing 40, curved rear end 88, and ledge 89 extending generally perpendicular from the bottom portion of reservoir 71. Ledge 89 is configured so that cable 111 can be placed thereon.

Figure 7A:
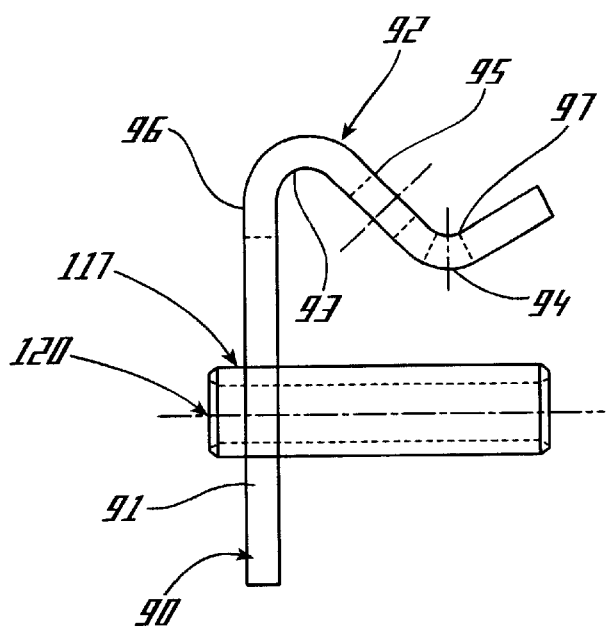
FIG. 7A is a side view of the safety actuating plate and the brake piston rod.
Figure 7B:
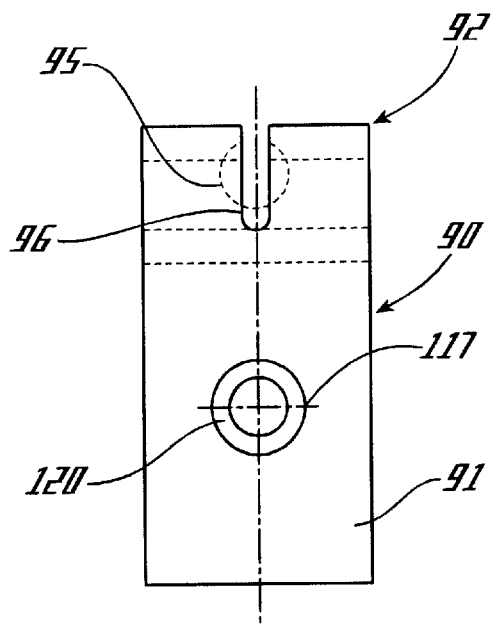
FIG. 7B is a front view of the safety actuating plate and the brake piston rod.
Figure 7C:
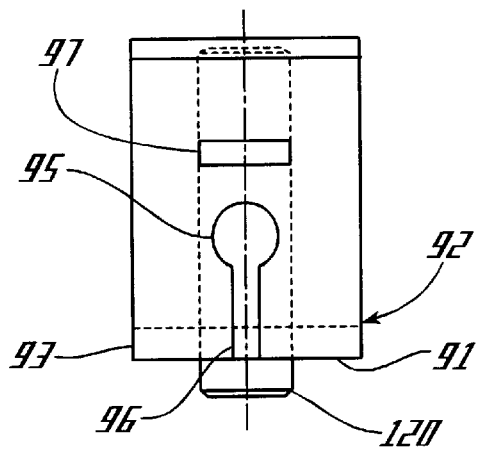
FIG. 7C is a top view of the safety actuating plate and the brake piston rod.

Referring to FIGS. 7A–7C, safety actuating plate 90 is typically formed from a strip heavy-duty sheet metal, generally rectangular in shape, which is then pressed into a shape having a flat vertical portion 91, and a bent upper portion 92. Flat vertical portion 91 has a hole 117 formed therethrough for receiving tube 120. Safety actuating plate 90 is mounted on tube 120 and rigidly affixed thereto by means such as welding. Bent upper portion 92 is first bent backward and downward such that first bend 93 forms an acute angle between the proximal end of upper portion 92 and the flat vertical portion 91. The distal end of upper portion 92 is then bent at second bend 94 such that the distal end extends from second bend 94 generally upward and thereout.

Between first bend 93 and second bend 94 a first hole 95 is formed therethrough, which is in communication with a slot 96, which is formed therethrough, and which extends from the hole 95 to first bend 93 and extends theredown along a portion of flat vertical face 91. At second bend 94 a second hole 97 is formed therethrough for receiving a head of screwdriver, or other such tool.

Referring to FIGS. 2, 3 and 7A–7C, safety cable 111 is placed in operable position in the following manner. Plug 115 is aligned beneath hole 95 and inserted therethrough and then positioned against flat vertical face 91. S-hook 114 is then pulled backward, and around curved reservoir end 88, and through cable opening 53, such that a portion of cable 111 rests upon ledge 89. Plug 115 is rigidly affixed to safety cable 111 and is of greater diameter than hole 95 and slot 96. Thus, when the first end 112 of safety cable 111 is pulled forward, plug 115 is pulled backward and the force is transmitted to safety actuating plate 90, causing safety actuating plate 90 to move backward and consequently actuating the brakes of the trailer, as will be described hereinbelow.

Referring to FIG. 4, top wall 23 of forward coupler 20 has a spring hole 29 formed therethrough for receiving a brake latch which is in the form of an inverted L-shaped spring 98 for latching behind safety actuating plate 90 when safety actuating plate 90 is pulled rearward by safety cable 111. Inverted L-shaped spring 98 is generally formed from a strip of resilient metal having a shoulder 99, an arm 100 extending generally horizontal from shoulder 99, and a leg 101 extending generally vertical from shoulder 99 with a hoop 102 distal from shoulder 99. Base leg 31 has a slot 36 formed therethrough for receiving arm 100 of inverted L-shaped spring 98. When inverted L-shaped spring 98 is in operable position, leg 101 extends down into hole 29 with shoulder 99 extending down to top wall 23, and arm 100 resting on top wall 23 generally parallel to sides 26 and 28. Arm 100 extends from shoulder 99 through slot 36 with a portion of arm 100 extending beyond base leg 31. The portion of arm 100 that extends beyond base leg 31 is rigidly affixed to top wall 23 by means such as welding or riveting. Safety actuating plate 90 is configured such that there exist a gap between top wall 23 and the bottom safety actuating plate 90, the gap being less then the height of the shoulder of the inverted L-shaped spring 98. When safety actuating plate 90 is pulled backward by safety cable 111, safety actuating plate 90 engages shoulder 99 of inverted L-shaped spring 98, pushing leg 101 further into spring hole 29. After safety actuating plate 90 has been pulled past shoulder 99, inverted L-shaped spring 98 snaps back into place, thereby preventing safety actuating plate 90 from moving back towards base leg 31. The relative rearward motion of safety actuating plate 90 causes tube 120 to be pushed against washer 119, thereby pushing washer 119 rearward which in turn causes piston rod 73 to be pushed rearward. The rearward motion of piston rod 73 actuates the trailer's brakes. Coil spring 116 remains compressed between safety actuating plate 90 and washer 119 for as long as safety actuating plate 90 is latched by inverted L-shaped spring 98. Thus, in the event of the forward coupler 20 becoming detached from ball 6 safety cable 111 working in cooperation with inverted L-shaped spring 98 latches safety actuating plate 90, thereby actuating the brakes of the trailer, and the brakes continue to applied while safety actuating plate 90 is locked by inverted L-shaped spring 98 even if safety cable 111 breaks thereafter.

Referring to FIG. 1, first sidewall 24 of forward coupler 20 and first side wall 44 of rear housing 40 have aligned release holes 37 and 54 formed therethrough, respectively. In order to release the trailers brakes when safety actuating plate 90 is locked into actuated position by inverted L-shaped spring 98 a screwdriver, or other such implement, is inserted into release holes 37 and 54, such that the screwdriver head is inserted into hoop 102 of the inverted L-shaped spring 98, and then the inverted L-shaped spring 98 is pulled downward so that the shoulder 99 no longer restrains safety actuating plate 90. In response to inverted L-shaped spring 98 being pulled down, safety actuating plate 90 is pushed back against base leg 31 by compressed coil spring 116.

Occasionally, it is necessary to bleed air out of the hydraulic brake line. This is typically done by pressurizing the hydraulic brake fluid in master brake cylinder 72, and then relieving the hydraulic pressure from a valve near the trailer's brakes. The instantaneous invention provides an easy means for pressurizing and pumping the hydraulic brake fluid in master brake cylinder 72.

Referring to FIG. 2 and FIGS. 7A–7C, top wall 43 of rear housing 40 has a brake priming opening 51 formed therethrough for receiving the head of a screwdriver, or other similar implement. Brake priming opening 51 is proximal to the front end 41 of rear housing 40, such that when rear housing 40 and forward coupler 20 are fully extended, as shown in FIG. 1, brake priming hole 51 is generally above upper portion 92 of safety actuating plate 90. The head of a screwdriver is inserted into brake priming hole 51 and aligned with hole 97 which is formed in the valley of upper portion 95 of safety actuating plate 90. Thus, the sides of the valley can be used to guide the head of the screwdriver into hole 97. With the blade of the screwdriver, or other such implement, properly inserted into hole 97 the master brake cylinder 72 is primed by moving the screwdriver head back and forth, thereby moving safety actuating plate 90 and brake piston rod 73 back and forth. The back and forth motion of piston head 77 primes master brake cylinder 72, and thus pressurizes the hydraulic brake fluid in master brake cylinder 72.

The term "housing" has been used to designate the support structure for enclosing and supporting the master brake cylinder and dampener; however, the housing can be other shapes suitable for mounting the master brake cylinder and dampener to the tongue of the trailer. Also, the master cylinder and dampener can be mounted either in the trailer tongue or the structure of the forward hitch, as long as they can respond to the relative movement of these elements. The master cylinder and dampener have been disclosed as being mounted in parallel inner connection between the forward hitch and rear housing; however, these elements can be mounted in tandem, if desired.

The opening 79 for entry and exit of the brake fluid of the master cylinder and the openings 80 and 81 of the dampener can be of different size or vertically offset with respect to each other or of other configuration so that as the brake fluid is progressively depleted in the reservoir the dampener is starved of brake fluid before the master cylinder is starved. This results in the dampening function being lost before the braking function is lost. The loss of the dampening function before the loss of the braking faction results in the operator of the towing vehicle detecting the jarring between the forward hitch and the rear housing, and therefore detecting the need for replenishing the brake fluid before the master cylinder loses its function.

Although a preferred embodiment of the invention has been disclosed in detail herein, it will be obvious to those skilled in the art that variations and modifications of the disclosed embodiment can be made without departing from the spirit and scope of the invention as set forth in the following claims.

I claim:

1. A trailer hitch assembly for a trailer having hydraulically actuated brakes, said assembly comprising:

a forward coupler for mounting to a towing vehicle;

a rear housing movably mounted with respect to said forward coupler for rigidly affixing to a tongue of a trailer;

a hydraulic brake fluid reservoir;

a hydraulic brake system having a master cylinder innerconnected between said forward coupler and said rear housing adapted to hydraulically brake the trailer, said brake system being actuated in response to said rear housing moving toward said forward coupler;

a hydraulic dampener innerconnected between said forward coupler and said rear housing hydraulically dampening the motion of said rear housing relative to said forward coupler, wherein said hydraulic dampener actuates independently of the actuation of said hydraulic brake system; and said hydraulic brake fluid reservoir in fluid communication with both said hydraulic dampener and said master cylinder and arranged to provide brake fluid to both said hydraulic dampener and said master cylinder and arranged to starve the hydraulic dampener of brake fluid upon starving said master cylinder of brake fluid.

2. A trailer hitch assembly as claimed in claim 1, wherein said rear housing has a first side wall, a second side wall and a top wall, said first side wall of said rear housing defines a opening for receiving a cable;

a flexible cable having a first end and a second end, said first end of said cable adapted to be removablely attached to a towing vehicle, and said first end of said cable extending through said opening of said rear housing; and means for attaching said second end of said cable to said master cylinder, wherein said attaching means actuates said master cylinder in response to a force being applied to said cable;

whereby when the forward coupler is demounted from a ball of a coupler and becomes displaced from the ball of a coupler and tension is applied to the cable, the brake of the trailer are applied.

3. A trailer hitch assembly as claimed in claim 2, further comprising: a latch for latching said master cylinder in an actuated position in response to said master cylinder being actuated by said cable.

4. A trailer hitch assembly as claimed in claim 3, further comprising: means for releasing said latch.

5. A trailer hitch assembly as claimed in claim 1, wherein said master brake cylinder includes a brake piston, and said top wall of said rear housing has an access hole formed therethrough, said access hole is adapted to receive a tool for engaging and reciprocating said brake piston.

6. A trailer hitch assembly as claimed in claim 5, wherein said hydraulic dampener includes a dampener cylinder, and wherein said dampener cylinder, said master brake cylinder and said reservoir are integrally formed.

7. The trailer hitch assembly of claim 1, wherein said reservoir, master brake cylinder and dampener are constructed and arranged to starve the dampener of brake fluid before starving the master brake cylinder of brake fluid.

8. The trailer hitch of claim 1, wherein said master cylinder and said dampener have openings in communication with said fluid reservoir of different configurations from each other.

9. A trailer hitch assembly as claimed in claim 1, wherein said dampener includes a dampener cylinder and a piston head slidably mounted therein, said piston head dividing said dampener cylinder into a fore chamber and an aft chamber, said fore and aft chambers in separate communication with said reservoir.

10. A trailer hitch assembly as claimed in claim 1, wherein said forward coupler includes a ball socket, and said forward coupler and said rear housing are slidably mounted for maintaining the tongue of the trailer axially aligned with the ball socket.

11. A trailer hitch assembly for a trailer having hydraulically actuated brakes the hitch assembly comprising:
- a forward coupler having a front end, a rear end, a first side wall, a second side wall, and a top wall, said front end of said forward coupler having an integral socket formed therein, said socket having a downward opening for receiving a ball of a vehicle, said first and second side wall extending generally downward from said top wall, thereby forming a generally hollow interior;
- a rear housing having a front end, a rear end, a first side wall, a second side wall, and a top wall, said first and second side wall of said rear housing extending generally downwardly from said top wall of said rear housing, thereby forming a generally hollow interior, wherein said rear housing is adapted to fit comfortably around said forward coupler when placed in operable position, said first and second side wall of said rear said rear housing having a plurality of aligned bolt holes formed therethrough, each of said bolt holes adapted to receive a bolt for bolting said rear housing to a tongue of a trailer;
- means for slidably mounting said forward coupler to said rear housing, wherein said forward coupler slides relative to said rear housing along the longitudinal direction;
- a coupling bracket defining a first hole and a second hole, each of said holes for receiving a rod of a piston, said coupling bracket rigidly affixed to said top wall of said forward coupler;
- a hydraulic brake fluid reservoir rigidly affixed to the interior portion of said top wall of said rear housing;
- a master brake cylinder in communication with said hydraulic brake fluid reservoir, wherein said master brake cylinder is aligned with the longitudinal direction of said forward coupler, and wherein said master brake cylinder includes means for coupling said master brake cylinder to a hydraulic brake line of a trailer, whereby hydraulic pressure created in the master brake cylinder is transmitted to the hydraulic brake line;
- a brake piston head coaxially aligned with said master brake cylinder, whereby hydraulic pressure is created in the master brake cylinder when the brake piston head moves rearward relative to the master brake cylinder;
- a piston rod having a first end and a second end, said first end of said piston rod rigidly affixed to said brake piston head, said second end extending through said first hole of said coupling bracket therebeyond, wherein said piston rod is configured to remain stationary relative to said forward coupler when said rear housing slides forward relative to said forward coupler, whereby relative forward motion of the rear housing causes the master brake cylinder to move forward with respect to the piston head, thereby creating hydraulic pressure in the master brake cylinder;
- a dampener cylinder aligned parallel to said master brake cylinder, and said dampener cylinder being in communication with said hydraulic brake fluid reservoir through at least one restrictive aperture;
- a dampening piston head being coaxially aligned with said dampener cylinder, whereby hydraulic pressure is created in the dampener cylinder when the dampening piston head moves rearward relative to the dampener cylinder;
- a dampening piston rod having a first end and a second end, said first end of said dampening piston rod being rigidly affixed to said dampening piston head, and said second end of said dampening piston rod extending through said second hole of said coupling bracket and rigidly affixed thereto, whereby relative forward motion of the rear housing causes the dampener cylinder to move forward with respect to the dampening piston head thereby creating hydraulic pressure in the dampener cylinder, and wherein hydraulic pressure in said dampener cylinder is relieved through said at least one restrictive aperture.

12. A trailer hitch assembly as claim 11, wherein said master brake cylinder, said dampener cylinder and said reservoir are integrally formed.

13. A trailer hitch assembly as claimed in claim 11, wherein said master brake cylinder and said dampener cylinder are rigidly affixed to said reservoir.

14. A trailer having an improved self actuated surge brake system including a forward hitch for mounting to a ball of a towing vehicle and a rear housing movably mount to said forward hitch for mounting to the tongue of a trailer, a hydraulic master brake cylinder and a hydraulic dampener each interconnected between said forward hitch and said rear housing, the improvement therein comprising:
- a hydraulic reservoir in fluid communication with both said master cylinder and said hydraulic dampener supplying brake fluid to said master cylinder and to said hydraulic dampener and said hydraulic reservoir arranged to starve said hydraulic dampener of brake fluid as said master cylinder is starved of brake fluid, wherein said hydraulic dampener actuates independently of said master brake cylinder.

15. The trailer of claim 14, wherein said master brake cylinder is positioned in said rear housing.

16. The trailer of claim 14, wherein said forward hitch is telescopically movable with respect to said rear housing.

17. The trailer of claim 14, wherein said master cylinder and said hydraulic dampener are mounted in parallel between said forward hitch and said rear housing.

18. The trailer of claim 14, wherein said reservoir is arranged to starve said dampener before starving said master brake cylinder of hydraulic fluid.

19. The trailer of claim 14, and further including a tether arranged for connection at one of its ends to a towing vehicle and connected at its other end to said master cylinder and arranged to actuate said master cylinder in response to tension being applied to said tether.

20. The trailer of claim 19, and further including a latch for holding said master cylinder in its actuated position in response to actuation of said master cylinder by said tether.

21. A trailer for towing behind a towing vehicle, comprising:
- a forward hitch and a rear housing movably connected to each other,
- a surge brake system actuated by the relative movement between said forwardhitch and said rear housing,
    said brake system including a master brake cylinder and a hydraulic dampener both responsive to the relative movement between said forward hitch and said rear housing, wherein said hydraulic dampener actuates independently of said brake system, and a brake fluid reservoir in fluid communication with both said master cylinder and said dampener supplying brake fluid to both said master cylinder and said hydraulic said brake fluid reservoir, master cylinder and dampener being constructed and ranged upon depletion of brake fluid to said master cylinder to allow said forward hitch and said rear housings to jar against each other in response to acceleration or deceleration of the towing vehicle.

22. The trailer of claim 21, wherein said fluid reservoir, master cylinder and dampener are constructed and arranged to cause said dampener to be starved of brake fluid before said master cylinder is starved of brake fluid.

23. The trailer of claim 21, wherein said forward hitch includes a ball socket, and said forward hitch and said rear housing are slidably mounted for maintaining a tongue of said trailer axially aligned with said ball socket.

24. A trailer hitch assembly for a trailer having hydraulically actuated brakes, said assembly comprising:

a forward coupler for mounting to a towing vehicle, said forward coupler having an integral ball socket formed therein, said socket having a downward opening for receiving a ball of a vehicle;

a rear housing movably mounted with respect to said forward coupler for rigidly affixing to a tongue of a trailer, wherein said forward coupler and said rear housing cooperate to maintain the axial alignment of the tongue of the trailer with said ball socket;

a hydraulic brake fluid reservoir;

a hydraulic brake system having a master cylinder innerconnected between said forward coupler and said rear housing adapted to hydraulically brake the trailer, said brake system being actuated in response to said rear housing moving toward said forward coupler, a hydraulic dampener innerconnected between said forward coupler and said rear housing hydraulically dampening the motion of said rear housing relative to said forward coupler independently of said brake system; and said hydraulic brake fluid reservoir in independent fluid communication with both said hydraulic dampener and said master cylinder and arranged to provide brake fluid to both said hydraulic dampener and said maser cylinder and arranged to starve the hydraulic dampener of brake fluid upon staving said master cylinder of brake fluid.

25. A trailer hitch assembly as claimed in claim 24, wherein said hydraulic dampener includes a dampener cylinder, and wherein said dampener cylinder, said master brake cylinder and said reservoir are integrally formed.

26. A trailer hitch assembly as claimed in claim 24, wherein said master brake cylinder and said hydraulic dampener are approximately horizontally aligned.

* * * * *